United States Patent
Marchand et al.

(10) Patent No.: US 7,079,635 B2
(45) Date of Patent: Jul. 18, 2006

(54) DOMESTIC ORIGINATION TO INTERNATIONAL TERMINATION COUNTRY SET LOGIC

(75) Inventors: Dean C. Marchand, Longmont, CO (US); Arthur Lance Springer, Waterloo, IA (US)

(73) Assignee: MCI, Inc., Ashburn, VA (US)

( * ) Notice: Subject to any disclaimer, the term of this patent is extended or adjusted under 35 U.S.C. 154(b) by 135 days.

(21) Appl. No.: 10/621,890

(22) Filed: Jul. 16, 2003

(65) Prior Publication Data

US 2004/0008831 A1 Jan. 15, 2004

Related U.S. Application Data

(63) Continuation of application No. 09/859,296, filed on May 17, 2001, now Pat. No. 6,618,475.

(51) Int. Cl.
*H04M 15/00* (2006.01)

(52) U.S. Cl. ............. 379/114.14; 379/145; 379/127.02; 379/127.01; 379/115.03

(58) Field of Classification Search ............. 379/189, 379/114.14, 144.03, 114.17, 114.19, 115.01, 379/126, 145, 127.01, 127.02, 115.03, 114.03
See application file for complete search history.

(56) References Cited

U.S. PATENT DOCUMENTS

| | | | | |
|---|---|---|---|---|
| 5,566,234 A | * | 10/1996 | Reed et al. | 379/188 |
| 5,602,906 A | * | 2/1997 | Phelps | 379/114.14 |
| 5,768,354 A | | 6/1998 | Lange et al. | |
| 6,618,475 B1 | * | 9/2003 | Marchand et al. | 379/145 |
| 6,763,098 B1 | * | 7/2004 | Allen et al. | 379/144.03 |

* cited by examiner

*Primary Examiner*—Rexford Barnie

(57) ABSTRACT

A method and device for preventing fraud in international calls in a long-distance telecommunications system, where selected customers can avoid fraud control blocks and greater granularity is achieved in blocking international destinations. In the method and device, an override flag is created in the records of the Billing Number Screening (BNS) database. When a call is made using a billing number whose corresponding record has the override flag set, the call is not stopped by fraud control blocks on certain international destinations. In addition, international destinations can be blocked with greater specificity because a Country Set Logic (CSET) field is added to the International City Code Database. The addition of CSET to this database allows particular international city destinations to be blocked from certain origin points.

11 Claims, 6 Drawing Sheets

DOMESTIC ORIGINATION TO INTERNATIONAL TERMINATION COUNTRY SET LOGIC

BACKGROUND

This application is a continuation of U.S. patent application Ser. No. 09/859,296, filed May 17, 2001, entitled "DOMESTIC ORIGINATION TO INTERNATIONAL TERMINATION COUNTRY SET LOGIC", now U.S. Pat. No. 6,618,475, which has a common assignee and inventorship to the present application, and the above noted patent application, is incorporated by reference in its entirety.

1. Technological Field

The present application relates generally to fraud control in telecommunications systems and, in particular, to preventing fraud in calls from a domestic origin point to an international terminating point in a long distance telecommunications network.

2. Description of the Related Art

The telecommunications industry has experienced significant changes in the way that customers are billed for their telephone calls. From the once simple method of billing the originating caller, many methods have been developed, allowing greater flexibility for the telecommunications customer. A predominant method for making telephone calls away from home or the office is by utilizing the telephone calling card to charge the call.

Calling card customers may use any telephone facility, including public facilities, to make a call that will be charged to their account. The process of making calls using a calling card typically includes dialing an "800" number, waiting for an audio prompt, and then entering an account number and a Personal Identification Number (PIN) into a telephone key pad device. The "800" (and now "888") number phone calls are one type of a category of phone calls called "special service" calls. These special service calls, which include "700", "800/888", and "900" number calls, allow contemporary telecommunications networks to provide many services beyond direct distance dialing. It is the long distance carriers that provide this special service call processing, which allows for toll-free calls, calling card calls, special rate calls, etc.

Following the example of a calling card call, once the account number and PIN have been entered, the calling card customer can make one or more calls from whatever location the customer is dialing in from. These calls are subsequently charged to the customer's calling card account. Calling cards can also be used to avoid having to pay additional surcharges when making calls from certain public facilities such as hotels and telephone booths.

As with many new technologies, the ease and flexibility of the use of calling cards has led to abuse, and has consequently brought about new types of fraud. Calling card fraud costs businesses (and consumers) millions of dollars annually. Current security mechanisms, while effective, are not fail-safe, and protection mechanisms for consumers and businesses require improvement to stem these fraud-related losses.

There is a virtual underground industry in stolen calling cards and authorization codes. The multitude of ways that calling cards and authorization numbers find their way into unscrupulous hands need not be discussed here, but suffice it to say there is no end to the ingenuity of the criminal mind.

One example of calling card fraud is the technique of "surfing" banks of public telephones, such as are at airports. Criminals "surf" by looking over the shoulders of legitimate card users as they key in the account number and PIN. Then they sell or distribute these numbers and rampant fraud results. In some cases, a single account may incur charges in excess of $100,000 in a single weekend. Calling card fraud and other forms of fraudulent use present pervasive problems for telephone carriers, particularly long distance carriers.

One method of fraud control is to simply remove calling card numbers against which it is suspected that fraudulent calls are being charged. In order to recognize fraudulent calls, a "billing number"—a billing product and an account number, such as a calling card, pre-paid phone card, etc.—is monitored over time. For example, where the number of domestic calls placed within a certain amount of time using the same billing number exceeds a certain threshold, an alert is generated. International calls may have a lower threshold so that fewer calls within the time period generate an alert. In addition, the threshold may be further adjusted for calls to countries where a high percentage of fraudulent calls are directed.

Another method of fraud control is to identify particular origin points that are linked to suspicious activity and to block certain calls from those particular origin points. For example, a large number of long duration calls to China may be generated from an exchange in Manhattan. This would generate a threshold alert, which is typically sent to a fraud analyst. A fraud analyst would be stationed at a fraud control console 100, as shown in FIG. 1. The fraud analyst analyzes the alert and the history of that exchange in order to determine whether or not to block that exchange from calling China. If the fraud analyst decides that there is fraudulent activity, he sets up a block on that exchange which will prevent subsequent calls to China or other international destinations that the fraud analyst selects.

The present invention concerns this type of blockage and, in particular, blocks on special service calls that originate domestically and terminate internationally. An example of this type of special service call is shown with reference to FIG. 1. The caller, using telephone 111, makes a calling card call by dialing a number in the format of 1-NPA-NXX-XXXX. NPA stands for Number Plan Area, often referred to as the "area code", which defines the geographic region of the number; NXX is the terminating exchange, typically identifying a switch within the geographic region; and XXXX is the unique station designation. For most calling cards, the number will take the form 1-800-NXX-XXXX, where the "800" signifies that the call is a special service call, rather than a geographic region. The call is routed through Local Exchange Carrier (LEC) 120. LEC refers to local telephone companies, such as the Regional Bell Operating Companies (RBOCs), which provide local transmission services for their customers. Because of the 1-800 format of the dialed number, the routers in the LEC will forward the call to the network of the appropriate long distance carrier (or Inter-Exchange Carrier IXC) 130. Special service telephone calls, such as "800" number calls, are provided by IXCs, such as MCI-Worldcom.

Returning to our call, after switching through LEC switches 122 and 124, the "800" number is routed from POP (Point-of-Presence) switch 125 into the IXC 130, and then through IXC switches 131 and 136, to a bridge switch 135. The purpose of the bridge switch 135 is to receive calls from the IXC network and bridge them to the Automatic Call Distributor (ACD) 140 and, ultimately, into the Intelligent Services Network platform (ISN) 150. Because special service calls require special call processing, they are typically routed to a call processing platform, such as the ISN platform 150. There are a number of ISNs within the IXC, but, for the purpose of understanding the present invention, one ISN will suffice.

An exemplary and simplified diagram of the ISN platform 150 will now be described with reference to FIG. 2. The ACD 140 is under the direct control of the Application Processor APP 156, which is a general purpose computer that functions as the central point for call routing control in the ISN 150. When the "800" number call arrives at the ACD 140, the ACD 140 makes a request to the APP 156 for directions as to how the call should be handled. Such a request would usually be accompanied by information concerning the call; i.e. the Automatic Number Identifier (ANI) of the caller and the destination number of the call. The APP 156 would recognize by the "800" prefix of the destination number that the call is a special services call and, consequently, the APP 156 would instruct the ACD 140 to deliver the call to the appropriate queue. In this case, assuming that the call is to a calling card "800" number, the call would queue up to the Automatic Response Unit (ARU) 152. The ARU 152 comprises two components, one to process the call, the other to prompt the caller with a voice response system. It is the ARU 152 that will ask the caller for the required final destination number, calling card number, and PIN. When a live operator is required, the call is routed to the Manual Telecommunications Operator Console (MTOC) 154. Whether the call is routed to the ARU 152 or the MTOC 154, the same informational decisions will have to be made. In other words, regardless of whether it is entered by the operator at the MTOC 154 or by the caller at her telephone 111 to the ARU 152, items such as the calling card account number will have to be entered.

During the course of servicing a call, the need often arises to "park" a call on the ACD 140. When a call is parked on the ACD 140, the call is active, i.e., there is a party on the call with an established voice channel connected to the ACD 140. The call is monitored and maintained at the ACD. Once a call is parked at the ACD, it is no longer under direct control of either the ARU 152 or the MTOC 154 that parked the call. This allows the facilities at the ISN 150 to be freed up to perform other tasks or services. When call processing is completed, and the call is authorized and validated, the call is released from the ACD 140 and the bridge switch 135 to the automated switching of the IXC network 130. As shown on FIG. 1, the call is then connected through IXC switch 137 to a telephone 199 in China.

Now, a simplified and exemplary call processing procedure will be described with reference to FIGS. 2, 3A, and 3B. Many steps that are required for call processing have been eliminated from the description as unnecessary for the understanding of Country Set Logic. Assuming that the special services call is a calling card call from a domestic origin to an international destination, the caller needs to enter her account number, PIN, and the terminating ANI. It is assumed that all of this data is input before the procedure begins, but, as one skilled in the relevant art would know, some of the data could just as well be entered during the procedure. Following this example, once input is complete, the access code is looked up in an access-level database, such as the Authorization Property Database (AUTH PROP) 168, at step 300 in FIG. 3A. The access code is the original 1-800-NXX-XXXX dialed in to access special services, and an access-level database is a database keyed to the various access codes.

Records in the Authorization Property Database 168 contain various items keyed to the access code, including operator scripts, billing products, and options. The AUTH PROP records also contain a field for Country Set Logic in order to indicate limitations on international destinations. Basically, Country Set Logic consists of this extra field where a term in the form CSETX (where X represents a number from 1 to 999) can be placed. For example, the access code "1-800-555-6543" might contain "CSET16" in its Country Set field (CSET). This means that, when the destination number is looked up in the international database, if the term "CSET16" appears in the international database, the call will be blocked. In step 305 of FIG. 3A, it is determined whether there is an access-level CSET term in the AUTH PROP 168. If there is, the CSET term is saved in step 307. If either there is no CSET term in step 305, or after the CSET term is stored in step 307, the call processing continues at step 310.

At step 310, the billing number associated with the customer account is looked up in the Billed Number Screening (BNS) database 160. The BNS contains records keyed by billing numbers and has flags to indicate various limitations on particular billing numbers. It is determined whether the billing number is flagged in step 315. If the billing number is flagged, the call may be re-routed to an MTOC 154, a fraud analyst at a fraud console 100, or simply disconnected. If the billing number is not flagged in step 315, the exchange of the originating ANI (the prefix NPA-NXX of the originating number) is looked up in an exchange-level database, such as the Exchange Master (X-MASTER) database 162, in step 320. The X-MASTER has records keyed on the various NPA-NXXs and also includes flags that indicate various limitations on particular exchanges. The records in the X-MASTER also contain a CSET field in order to indicate limitations on international destinations. In the same manner as the access-level database, if the originating exchange NPA-NXX contains "CSET32" in its CSET field and the term "CSET32" appears in the international database, the call will be blocked.

The CSET logic is the primary focus for the rest of this application. With this in mind, the X-MASTER 162 and other databases discussed here would likely be accessed for other purposes, such as viewing other flags and fields. For example, X-MASTER 162, like the BNS 160 in step 310, is typically accessed to determine if there are other blocking flags on the originating exchange. This step, and others, have been left out as extraneous to an understanding of Country Set logic and the present invention.

Returning to the call processing procedure, in step 325, it is determined whether there is a CSET term in the particular NPA-NXX record in X-MASTER 162. If there is, the CSET term is saved in step 327. In step 327, if there was a previously stored access-level CSET, it is deleted and replaced with the exchange-level CSET. This establishes greater granularity, because the exchange-level is much narrower than the access-level. If either there is no CSET term in step 325, or after the CSET term is stored in step 327, the call processing continues at step 330.

In step 330, the originating ANI is looked up in an ANI-level database, such as the ANI Property database (ANI PROP) 169. The ANI PROP 169 contains records keyed to ANIs, and the records contain flags, fields, and other information unique to that ANI. This provides the greatest granularity, because a particular payphone can be blocked using an ANI-level database. There is also a CSET field in the ANI PROP 169 records and, in step 335, it is determined whether there is a CSET term in the originating ANI's record in the ANI PROP 169. If there is, the CSET term is saved in step 337. In step 337, if there was a previously stored access- or exchange-level CSET, it is deleted and replaced with the ANI-level CSET.

Since the focus is on the CSET logic, if there is either no CSET term in step 335, or after the CSET term is stored in step 337, the procedure jumps to step 350 on FIG. 3B, leaving out many call processing details. In step 350, the destination number is checked against the International Country Code Database (INTERNAT'L COUNTRY) 164. The INTERNAT'L COUNTRY has records keyed on the various international country codes and also includes flags that indicate various limitations on the particular countries. The records in the INTERNAT'L COUNTRY also contain a field for Country Set Logic in order to indicate limitations on international destinations. In step 355, it is determined whether there is a matching CSET in the INTERNAT'L COUNTRY. If there is a matching CSET in step 355, the call is blocked. If not, call processing continues until completion. During the continuation of call processing, other databases, including the International City Code (INTERNAT'L CITY) database 166, are accessed.

This method is effective in eliminating fraudulent calls made from origin points that have been recognized as generating a large amount of fraudulent calls to particular international destinations. Typically, fraud control 100 maintains a fraud-to-revenue ratio in relation to particular exchanges calling particular countries. Once this fraud-to-revenue ratio reaches a certain threshold, some form of CSET logic is placed on the originating exchange/destination country combination. This type of block makes sense because most hackers will move from phone to phone within a certain area. Thus, the conventional method eliminates a great deal of fraud; however, it is troublesome to legitimate callers within that exchange. A calling card customer making a non-fraudulent call within that exchange will be blocked from calling that international destination. In addition, blocking the entire country will sometimes cast a much larger net than is needed for the task.

Therefore, there is a need to allow legitimate callers to make calls from blocked exchanges to international destinations. In addition, there is a need to permit finer granularity in blocking calls to international destinations.

SUMMARY

One object of this invention is to provide a system and method of allowing legitimate callers to make calls from areas blocked from calling certain international destinations in a telecommunications network.

Another object of this invention is to provide a system and a method for overriding fraud control blocks on exchanges or billing products from calling certain international destinations in a telecommunications network.

Yet another object of this invention is to provide a system and a method for blocking billing products, exchanges, or ANIs from calling certain international cities in a telecommunications network.

To accomplish the above and other objects, a system and method for preventing fraud on international special service calls in a long distance telecommunication system is disclosed. In one aspect of this system and method, an override flag is created in the records of the Billing Number Screening (BNS) database so that selected customers can override fraud control blocks. When a call is made using a billing number whose corresponding record has the override flag set, the call is not stopped by fraud control blocks on certain international destinations. In another aspect of the system and method, international destinations can be blocked with greater specificity because a Country Set Logic (CSET) field is added to the International City Code Database. The addition of CSET to this database allows particular international city destinations to be blocked from certain origin points.

BRIEF DESCRIPTION OF THE FIGURES

The foregoing and other objects, aspects and advantages will be better understood from the following detailed description of a preferred embodiment as illustrated in the following drawings. In the drawings, like reference numbers indicate identical or functionally similar elements.

DETAILED DESCRIPTION OF THE PREFERRED EMBODIMENTS

In the following description, the term "network" is a short-hand description of the conglomeration of databases, trunk and telephone lines, routers, switches, protocols, and computers that are required to make a telecommunications network.

In short, the preferred embodiment of the present system and method allows overrides of CSET Logic blocks and establishes greater granularity for the international areas being blocked. In one aspect, an override flag is added to the BNS so that particular billing numbers will not be blocked by some of the CSET Logic. In another aspect, CSET logic is added to an International City Code database already resident in the ISN platform.

An exemplary and simplified international special service call processing procedure according to the preferred embodiment of the present invention will be described with reference to FIGS. 4A and 4B. The special service calls considered here all have a domestic origination. As stated above, many steps that are required for call processing have been eliminated from the description as unnecessary for the understanding of the preferred embodiment of the present invention.

Figure 1:
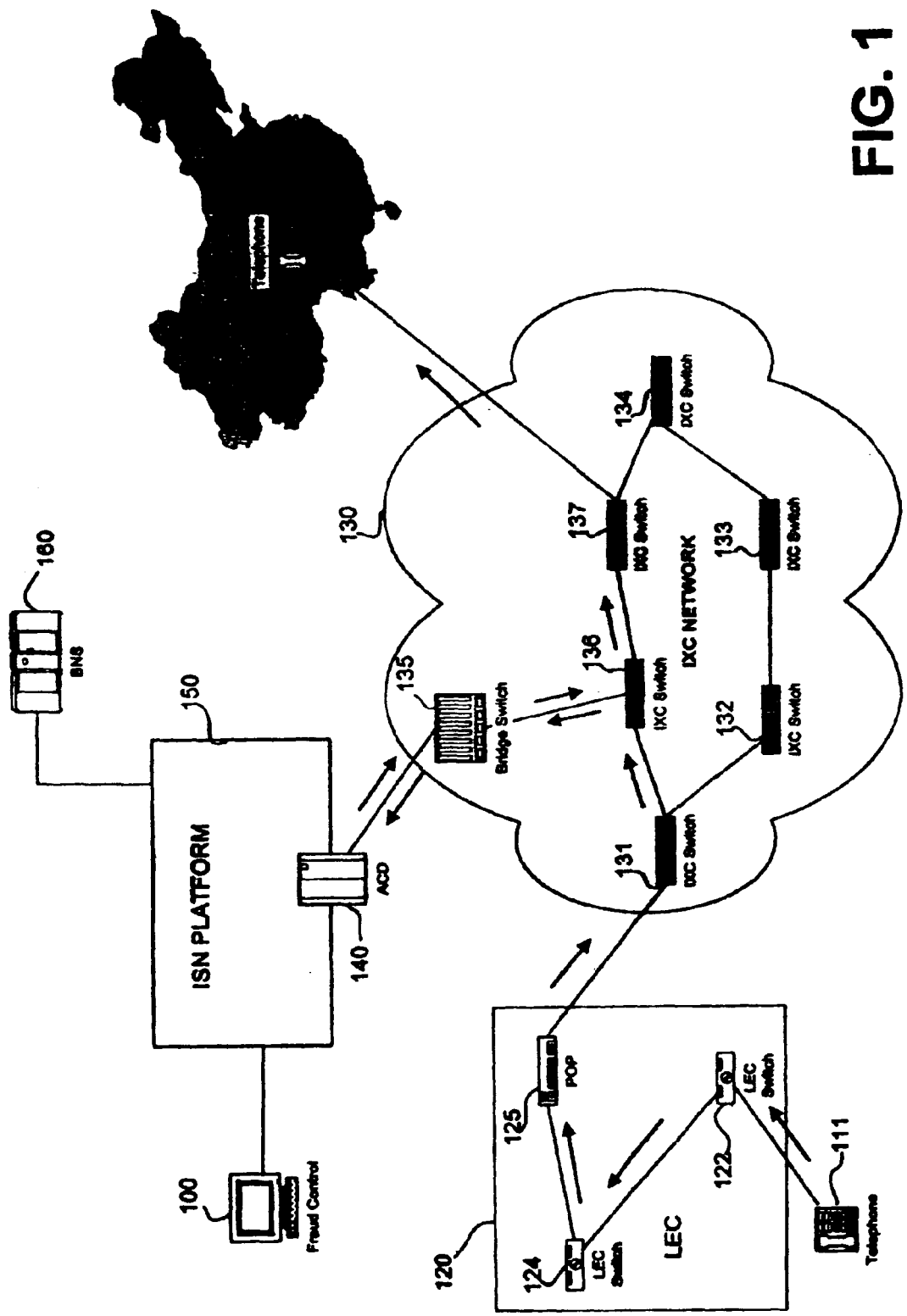
FIG. 1 is a schematic diagram of a long distance telephone system, according to the prior art.
Figure 2:
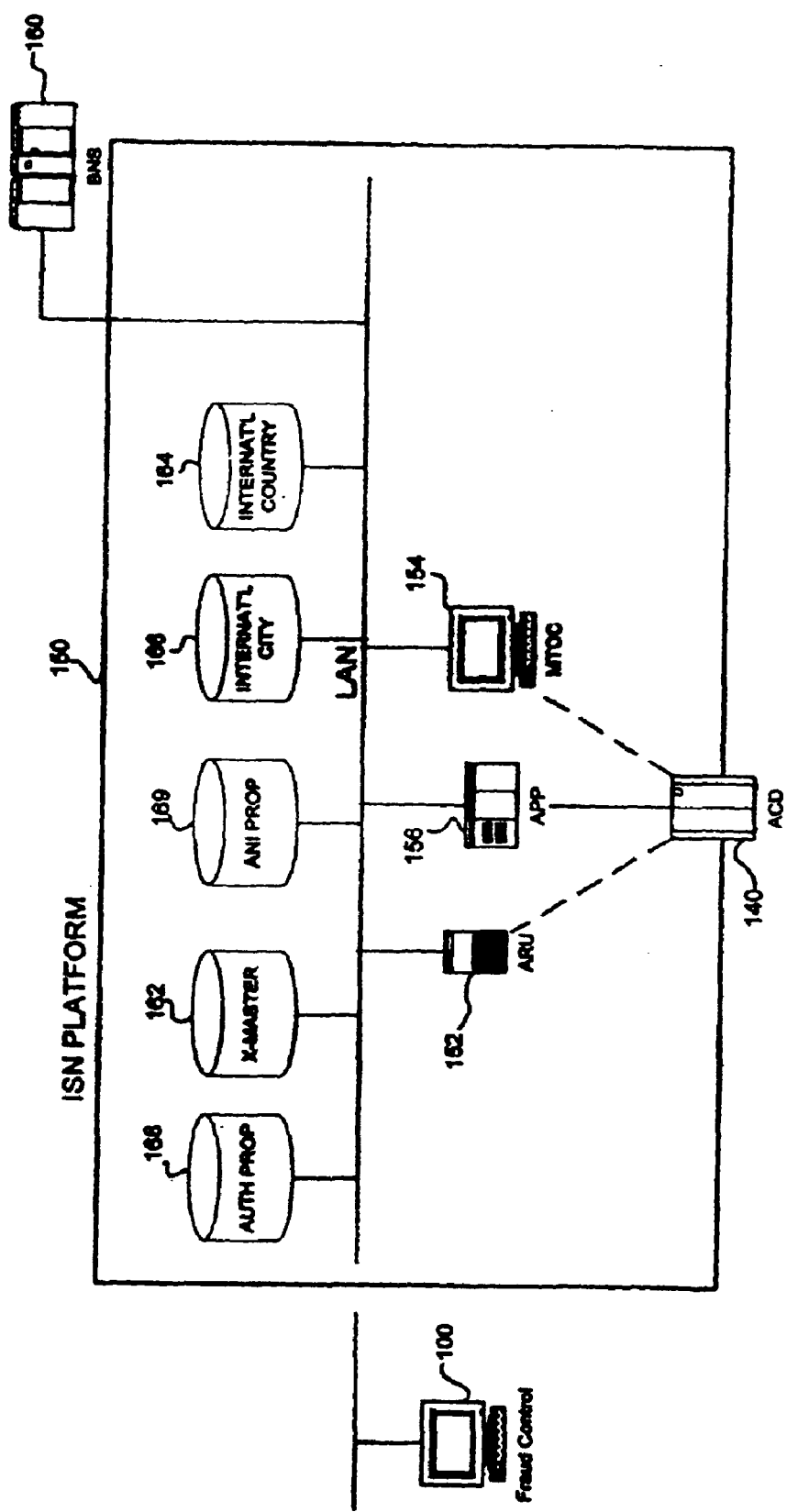
FIG. 2 is a schematic diagram of an exemplary and simplified call processing platform with associated fraud control system, according to the prior art.
Figure 3A:
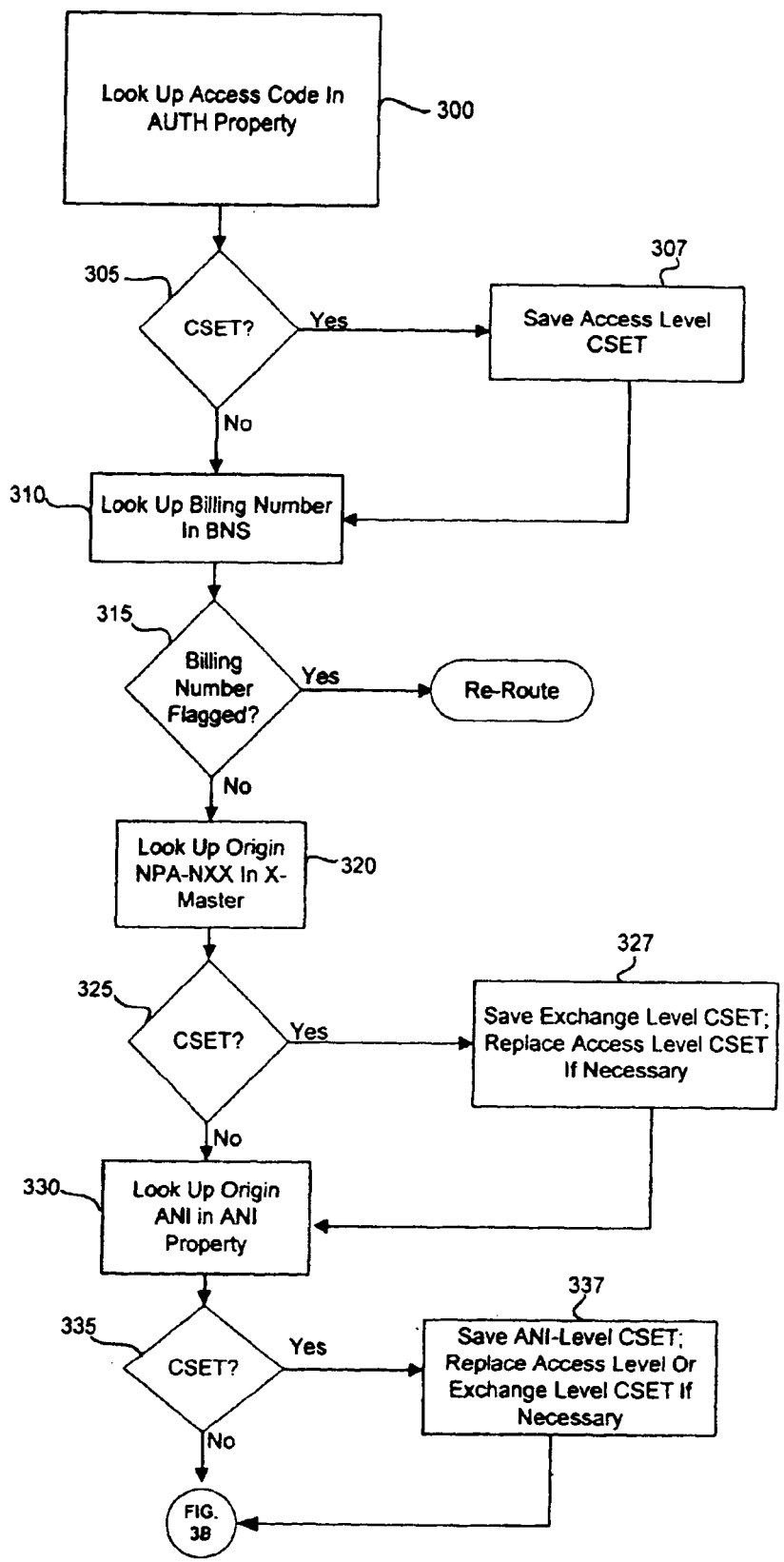
FIGS. 3A and 3B make up a flowchart of the CSET Logic call processing procedure, according to the prior art.
Figure 3B:
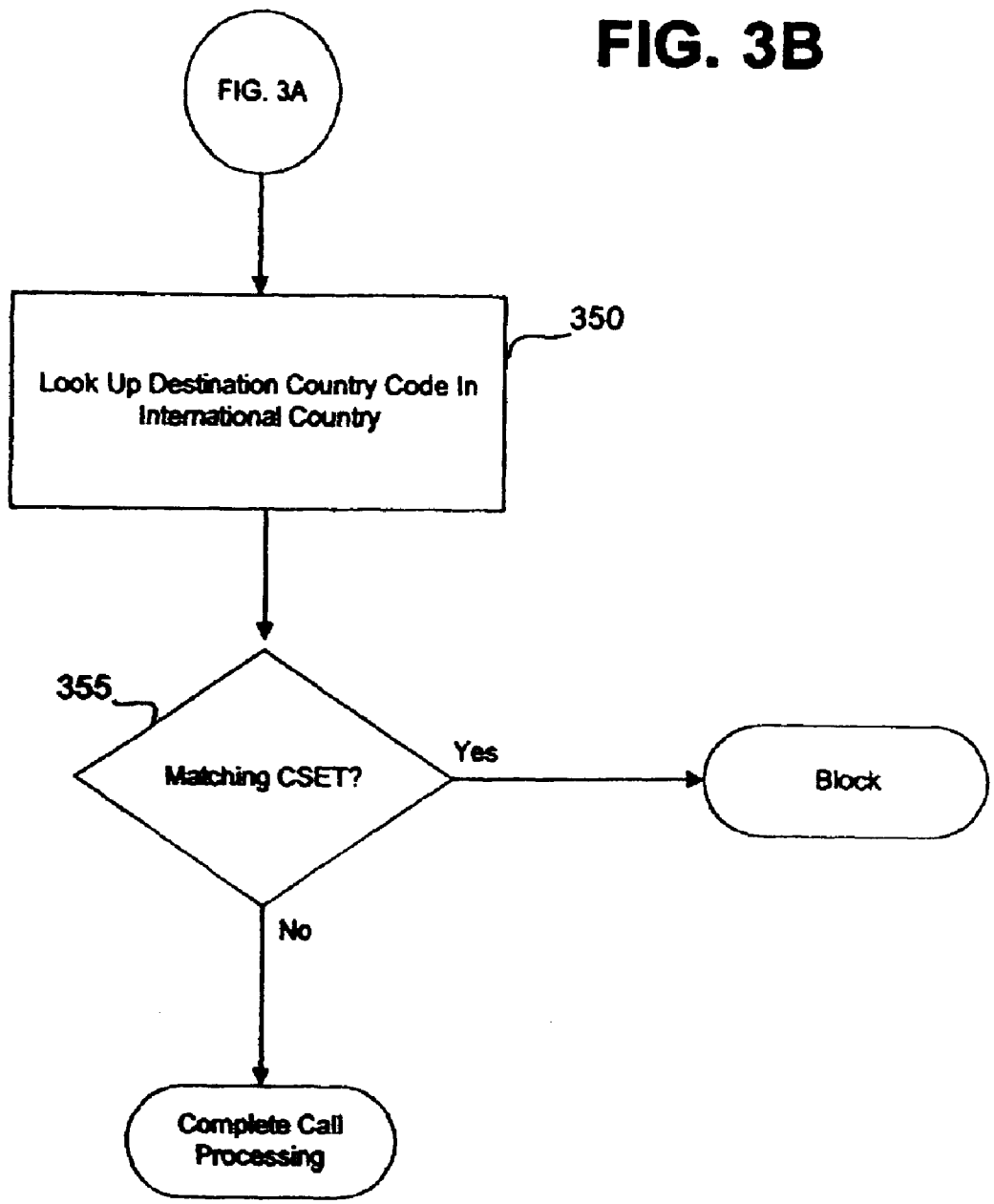
Figure 4A:
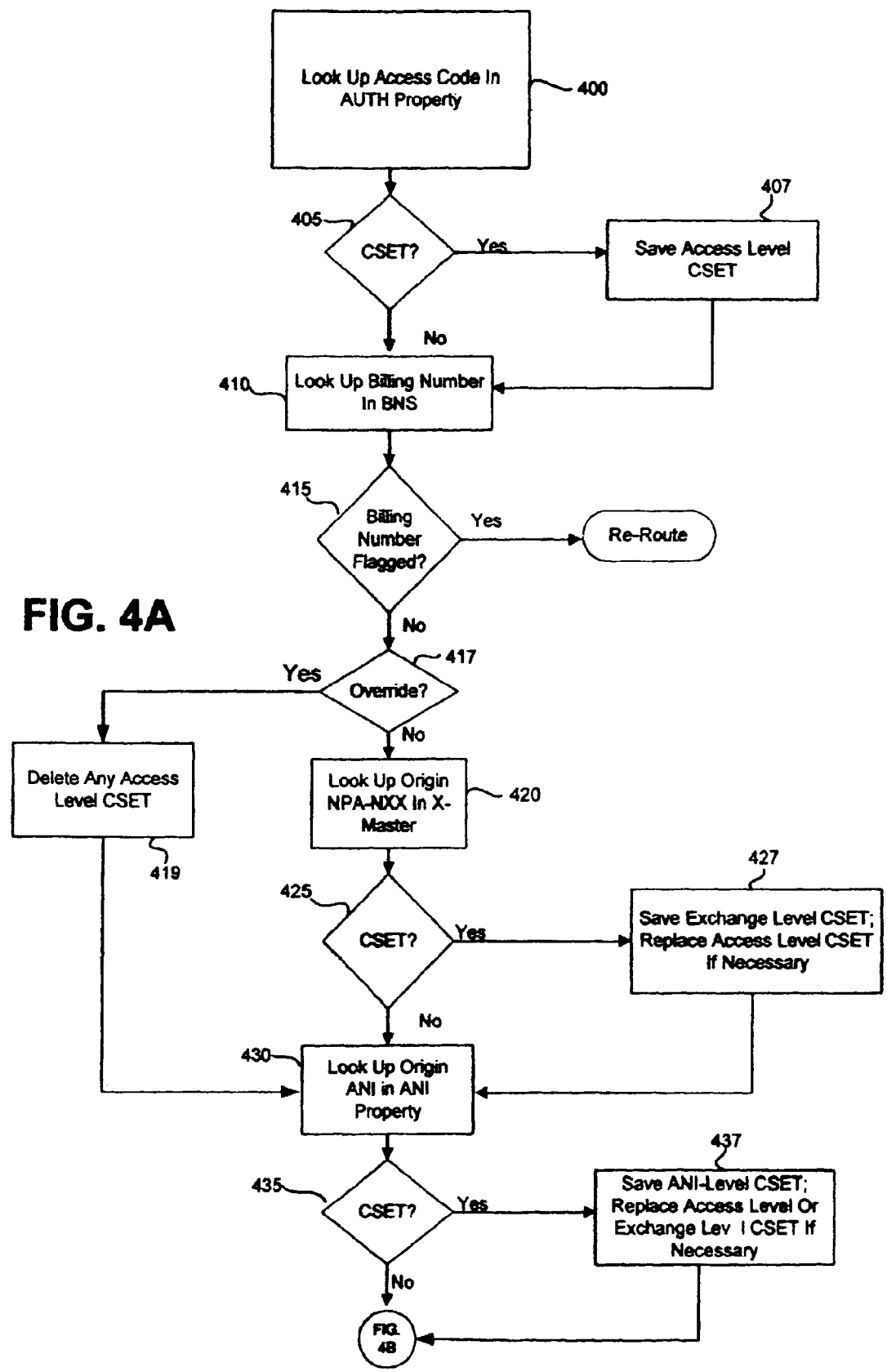
FIGS. 4A and 4B make up a flowchart of a CSET Logic call processing procedure, according to the preferred embodiment of the present system and method.
Figure 4B:
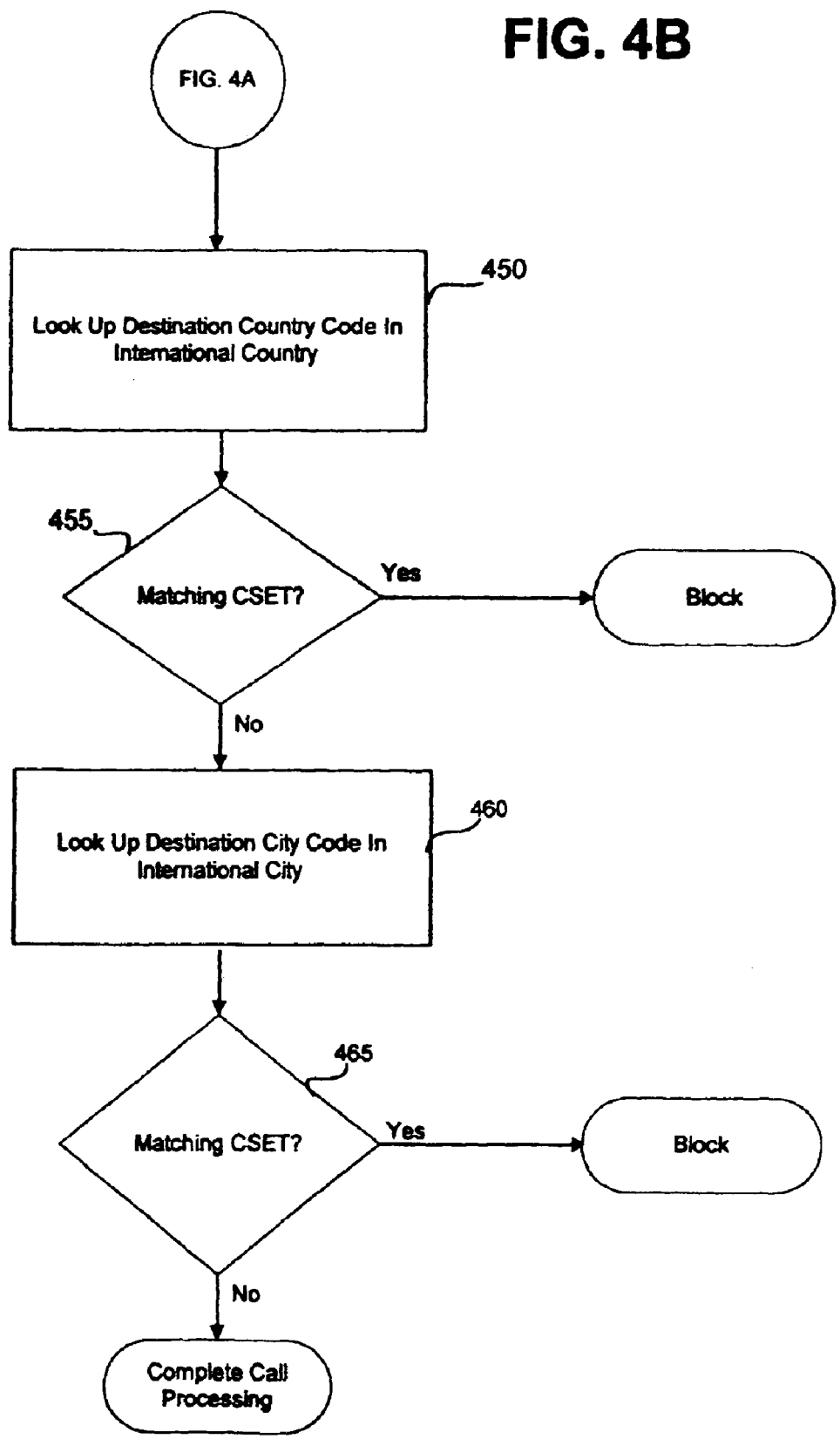

In a similar manner to what was described above, the access code is looked up in an access-level database, such as the Authorization Property Database (AUTH PROP) 168, at step 400 in FIG. 4A. In step 405, it is determined whether there is an access-level CSET term in the AUTH PROP 168. If there is, the CSET term is saved in step 407. If either there is no CSET term in step 405, or after the CSET term is stored in step 407, the billing number associated with the customer account is looked up in the BNS 160 at step 410. In step 415, it is determined whether the billing product is flagged for fraud. If the billing number is flagged, the call will be re-routed or simply disconnected.

If the billing number is not flagged in step 415, it is determined whether an override flag is set in step 417. The override flag can be set either by a fraud analyst at the fraud control console 100 or by an automated program at the fraud control console 100. When either the fraud analyst or automated program determines that the billing number is with a customer whose past security and account history indicates a low risk for fraudulent behavior, they will set the override flag in the BNS 160. If it is determined that the override flag is set in step 417, any access-level CSET term that was saved in step 407 is deleted in step 419. Then, the call processing procedure jumps to step 430, where the originating ANI is looked up in the ANI PROP 169. This allows the low-risk customer to call either from blocked exchanges, or with a blocked access code or billing product, while still permitting fraud control 100 to block particular high-risk ANIs from making calls to certain international destinations. Although the procedure "jumps" over the X-MASTER look-up step to the ANI PROP look-up step 430, it should be noted that that the X-MASTER 162 is typically still accessed during call processing, just not for CSET logic. In addition, another embodiment of the present invention would allow a "super" flag that would also override the ANI-level CSET Logic. This means that there may be CSET terms in some of the other databases, but they will be ignored because of the customer's special classification.

If it is determined that the override flag is not set in step 417, the exchange of the originating ANI is looked up in the X-MASTER database 162 in step 420. In step 425, it is determined whether there is a CSET term in the X-MASTER 162. If there is one or more CSET terms, the CSET term(s) is saved in step 427. In step 427, if there was a previously stored access-level CSET, it is deleted and replaced with the exchange-level CSET. If either there is no CSET term in step 425, or after the CSET term is stored in step 427, the call processing continues at step 430.

At step 430, the originating ANI is looked up in the ANI PROP 169. After accessing the originating ANI record in the ANI PROP 169 in step 430, it is determined whether the originating ANI has one or more CSET terms in step 435. If there is one or more CSET terms in step 435, the CSET term is saved in step 437. In step 437, if there was a previously stored access-level or exchange-level CSET, it is deleted and replaced with the ANI-level CSET. If either there is no CSET term in step 435, or after the CSET term is stored in step 437, the procedure jumps to step 450 in FIG. 4B. The destination number is looked up in the INTERNAT'L COUNTRY 164 at step 450. In step 455, it is determined whether there is a matching CSET in the INTERNAT'L COUNTRY. If there is a matching CSET in step 455, the call is blocked.

If there is no matching CSET in step 455, call processing continues at step 460, where the destination number is looked up in the International City Code Database (INTERNAT'L CITY) 166. The INTERNAT'L CITY 166 has records keyed on the various international city codes and also includes flags that indicate various limitations on the particular international cities. In the preferred embodiment of the present invention, the records in the INTERNAT'L CITY 166 also contain a field for Country Set Logic in order to indicate limitations on international cities. In the preferred embodiment, the INTERNAT'L CITY 166 is always accessed for special service international calls, so checking for matching CSET logic adds little processing time to the procedure. In step 465, it is determined whether there is a matching CSET in the INTERNAT'L CITY 166. If there is a matching CSET in step 465, the call is blocked. If not, call processing is continued to completion.

The CSET Logic addition to the INTERNAT'L CITY 166 provides greater granularity in blocking international destinations. It also provides greater flexibility. For instance, the term "CSET978" might be in the INTERNAT'L COUNTRY 164 record for Afghanistan, and in the INTERNAT'L CITY 166 records for Beirut and Istanbul. Thus, any international special service calls with that CSET logic would be blocked from those destinations. In another embodiment, the CSET Logic is applied to sequence numbers in the INTERNAT'L COUNTRY 164. For example, the United Kingdom may be Country Code 14 (CC14), and its constituent countries, England, Scotland, and Northern Ireland, have sequence numbers, such as 1, 2, and 3, within CC14. Adding the CSET Logic to individual sequence numbers would also increase granularity, allowing Scotland to be blocked without blocking the rest of the United Kingdom.

As one skilled in the relevant art would recognize, many elements of a telecommunications network have been left out in order not to obscure the invention in details unnecessary to the understanding of the present invention. In addition, although the above-described embodiment is the preferred embodiment, many modifications would be obvious to one skilled in the art.

While the present invention has been described with respect to a certain preferred embodiment, it should be understood that the invention is not limited to this particular embodiment, but, on the contrary, the invention is intended to cover all modifications, equivalents, and alternatives falling within the spirit and scope of the invention as defined by the appended claims.

What is claimed is:

1. A method for suppressing a fraud control block in a telecommunications system, comprising the steps of:

maintaining at least one record associated with a customer account;

adding an override flag field to each of the at least one record;

determining if an override flag is set in a record of the at least one record, when said record is accessed during call processing of a call using a customer account associated with said record;

overriding one or more fraud control blocks on an exchange blocked from processing the call if it is determined that the override flag is set; and if overriding the one or more fraud control blocks, blocking the call based on an originating number of the call.

2. The method as recited in claim 1, wherein the at least one record in the maintaining step is maintained in a Billed Number Screening (BNS) database.

3. The method as recited in claim 1, wherein the call in the determining step is a special service call.

4. The method as recited in claim 3, wherein the special service call is an international call.

5. A device for suppressing a fraud control block in a telecommunications system, comprising:

a database for maintaining at least one record associated with a customer account and having an override flag;

means for determining if the override flag is set in a record of the at least one record, when said record is accessed during call processing of a call using a customer account associated with said record;

means for overriding one or more fraud control blocks on an exchange blocked from processing the call if the determining means determines that the override flag is set; and means for blocking the call based on an originating number of the call, if the overriding means overrides the one or more fraud control blocks.

6. The device as recited in claim 5, wherein the database is a Billing Number Screening (BNS) database.

7. The device as recited in claim 5, wherein the call is a special service call, and further wherein the means for determining and the means for overriding comprises a call processing platform.

8. A method of fraud control for a call from an originating number to an international destination, comprising:

overriding a call block to the international destination applied at an exchange level of the originating number, based on an override flag associated with an account of the caller; and blocking the call based on the originating number if the call block at the exchange level of the originating number is overridden.

9. The method as recited in claim 1, wherein the call is blocked based on a comparison of a first field value of an origin record associated with an origin point of the call and a second field value of a destination city record associated with a destination city of the call.

10. The device as recited in claim 5, wherein the call is blocked based a comparison of a first field value of an origin record associated with an origin point of the call and a second field value of a destination city record associated with a destination city of the call, if the overriding means overrides the one or more fraud control blocks.

11. The method as recited in claim 8, wherein the call is blocked based on a comparison of a first field value of an origin record associated with an origin point of the call and a second field value of a destination city record associated with a destination city of the call if the call block at the exchange level of the originating number is overridden.

* * * * *